US007761544B2

(12) United States Patent
Manasseh et al.

(10) Patent No.: US 7,761,544 B2

(45) Date of Patent: Jul. 20, 2010

(54) METHOD AND APPARATUS FOR INTERNAL AND EXTERNAL MONITORING OF A TRANSPORTATION VEHICLE

(75) Inventors: Fredrick Mark Manasseh, Shoham (IL); Omri Ben-Tov, Cfar-Saba (IL); Martin Roberts, Hampshire (GB)

(73) Assignee: Nice Systems, Ltd., Ra'Anana (IL)

( * ) Notice: Subject to any disclaimer, the term of this patent is extended or adjusted under 35 U.S.C. 154(b) by 530 days.

(21) Appl. No.: 10/506,787

(22) PCT Filed: Mar. 6, 2003

(86) PCT No.: PCT/IL03/00185

§ 371 (c)(1), (2), (4) Date: Jun. 15, 2005

(87) PCT Pub. No.: WO03/074326

PCT Pub. Date: Sep. 12, 2003

(65) Prior Publication Data

US 2005/0258942 A1 Nov. 24, 2005

Related U.S. Application Data

(60) Provisional application No. 60/362,073, filed on Mar. 7, 2002.

(51) Int. Cl.
*G06F 15/173* (2006.01)

(52) U.S. Cl. ..................................................... 709/223

(58) Field of Classification Search ................. 709/223, 709/200; 340/574
See application file for complete search history.

(56) References Cited

U.S. PATENT DOCUMENTS 4,145,715 A 3/1979 Clever (Continued)

FOREIGN PATENT DOCUMENTS

DE 10358333 7/2005

(Continued)

OTHER PUBLICATIONS (Hebrew) print from Haaretz, "The Computer at the Other End of the Line", Feb. 17, 2002.

(Continued)

*Primary Examiner*—Jeffrey Pwu
*Assistant Examiner*—Farhad Ali
(74) *Attorney, Agent, or Firm*—Ohlandt, Greeley, Ruggiero & Perle, LLP

(57) ABSTRACT

An apparatus and method for the monitoring and recording of data stream associated with a transportation vehicle (10), the apparatus comprising at least one capture device (36) for receiving the data stream depicting activities within the transportation vehicle (10); at least one recording device (34) for recording the captured data stream about the activities within the transportation vehicle (10); and a communication device (32) for communicating the recorded data stream to a monitoring station (24, 26).

38 Claims, 6 Drawing Sheets

U.S. PATENT DOCUMENTS

| | | | |
|---|---|---|---|
| 4,527,151 A | 7/1985 | Byrne | |
| 4,821,118 A | 4/1989 | Lafreniere | |
| 4,888,652 A * | 12/1989 | Sander | 360/5 |
| 5,051,827 A | 9/1991 | Fairhurst | |
| 5,091,780 A | 2/1992 | Pomerleau | |
| 5,303,045 A | 4/1994 | Richards et al. | |
| 5,307,170 A | 4/1994 | Itsumi et al. | |
| 5,353,168 A | 10/1994 | Crick | |
| 5,404,170 A | 4/1995 | Keating | |
| 5,491,511 A | 2/1996 | Odle | |
| 5,519,446 A | 5/1996 | Lee | |
| 5,734,441 A | 3/1998 | Kondo et al. | |
| 5,742,349 A | 4/1998 | Choi et al. | |
| 5,751,346 A | 5/1998 | Dozier et al. | |
| 5,790,096 A | 8/1998 | Hill, Jr. | |
| 5,796,439 A | 8/1998 | Hewett et al. | |
| 5,847,755 A | 12/1998 | Wixson et al. | |
| 5,895,453 A | 4/1999 | Cook | |
| 5,917,405 A * | 6/1999 | Joao | 340/426.17 |
| 5,920,338 A | 7/1999 | Katz | |
| 6,014,647 A | 1/2000 | Nizzar et al. | |
| 6,028,626 A | 2/2000 | Aviv | |
| 6,031,573 A | 2/2000 | MacCormack et al. | |
| 6,037,991 A | 3/2000 | Thro et al. | |
| 6,070,142 A | 5/2000 | McDonough et al. | |
| 6,081,606 A | 6/2000 | Hansen et al. | |
| 6,092,197 A | 7/2000 | Coueignoux | |
| 6,094,227 A | 7/2000 | Guimier | |
| 6,097,429 A | 8/2000 | Seely et al. | |
| 6,111,610 A | 8/2000 | Faroudja | |
| 6,134,530 A | 10/2000 | Bunting et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,198,920 B1 | 3/2001 | Doviak et al. | |
| 6,212,178 B1 | 4/2001 | Beck | |
| 6,225,890 B1 * | 5/2001 | Murphy | 340/426.19 |
| 6,230,197 B1 | 5/2001 | Beck et al. | |
| 6,246,320 B1 * | 6/2001 | Monroe | 340/506 |
| 6,295,367 B1 | 9/2001 | Crabtree et al. | |
| 6,327,343 B1 | 12/2001 | Epstein et al. | |
| 6,330,025 B1 | 12/2001 | Arazi et al. | |
| 6,345,305 B1 | 2/2002 | Beck et al. | |
| 6,404,857 B1 | 6/2002 | Blair et al. | |
| 6,427,137 B2 | 7/2002 | Petrushin | |
| 6,441,734 B1 | 8/2002 | Gutta et al. | |
| 6,480,098 B2 * | 11/2002 | Flick | 340/7.2 |
| 6,549,613 B1 | 4/2003 | Dikmen | |
| 6,559,769 B2 * | 5/2003 | Anthony et al. | 340/574 |
| 6,570,608 B1 | 5/2003 | Tserng | |
| 6,604,108 B1 | 8/2003 | Nitahara | |
| 6,628,835 B1 | 9/2003 | Brill et al. | |
| 6,704,409 B1 | 3/2004 | Dilip et al. | |
| 7,076,427 B2 | 7/2006 | Scarano et al. | |
| 7,103,806 B1 | 9/2006 | Horvitz | |
| 2001/0043697 A1 | 11/2001 | Cox et al. | |
| 2001/0052081 A1 | 12/2001 | McKibben et al. | |
| 2002/0005898 A1 | 1/2002 | Kawada et al. | |
| 2002/0010705 A1 | 1/2002 | Park et al. | |
| 2002/0059283 A1 | 5/2002 | Shapiro et al. | |
| 2002/0087385 A1 | 7/2002 | Vincent | |
| 2002/0091473 A1 * | 7/2002 | Gardner et al. | 701/35 |
| 2003/0033145 A1 | 2/2003 | Petrushin | |
| 2003/0059016 A1 | 3/2003 | Lieberman et al. | |
| 2003/0128099 A1 | 7/2003 | Cockerham | |
| 2003/0163360 A1 | 8/2003 | Galvin | |
| 2004/0098295 A1 | 5/2004 | Sarlay et al. | |
| 2004/0141508 A1 | 7/2004 | Schoeneberger et al. | |
| 2004/0161133 A1 | 8/2004 | Elazar et al. | |
| 2004/0249650 A1 | 12/2004 | Freedman et al. | |
| 2006/0093135 A1 | 5/2006 | Fiatal et al. | |

FOREIGN PATENT DOCUMENTS

| | | |
|---|---|---|
| EP | 1 484 892 | 12/2004 |
| GB | 9916430.3 | 7/1999 |
| WO | WO 95 29470 A | 11/1995 |
| WO | WO 98 01838 A | 1/1998 |
| WO | WO 00/73996 A1 | 12/2000 |
| WO | WO 02/37856 | 5/2002 |
| WO | WO 03 013113 A2 | 2/2003 |
| WO | WO 03 067360 A2 | 8/2003 |
| WO | WO 03 067884 A1 | 8/2003 |
| WO | WO 2004 091250 | 10/2004 |

OTHER PUBLICATIONS

NiceVision—Secure your Vision, a prospect by Nice Systems, Ltd.

Nice Systems announces New Aviation Security Initiative, reprinted from Security Technology & Design.

(Hebrew) "the Camera That Never Sleeps" from Yediot Aharonot.

Freedman, I. Closing the Contact Center Quality Loop with Customer Experience Management, Customer Interaction Solutions, vol. 19, No. 9, Mar. 2001.

PR Newswire, Nice Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from InformationWeek, http://www.informationweek.com/story/IWK20030223S0002.

Sedor—Internet pages form http://www.dallmeier-electronic.com.

Article Sertainty—Automated Quality Monitoring—SER Solutions, Inc.—21680 Ridgetop Circle Dulles, VA—www.ser.com.

Article Sertainty—Agent Performance Optimization—2005 SE Solutions, Inc.

Lawrence P. Mark SER—White Paper—Sertainty Quality Assurance—2003 -2005 Ser Solutions Inc.

Douglas A. Reynolds Robust Text Independent Speaker Identification Using Gaussian Mixture Speaker Models—IEEE Transactions on Speech and Audio Processing, vol. 3, No. 1, Jan. 1995.

Chaudhari, Navratil, Ramaswamy, and Maes Very Large Population Text-Independent Speaker Identification Using Transformation Enhanced Multi-Grained Models—Upendra V. Chaudhari, Jiri Navratil, Ganesh N. Ramaswamy, and Stephane H. Maes—IBM T.j. Watson Research Centre—Oct. 2000.

Douglas A. Reynolds, Thomas F. Quatieri, Robert B. Dunn Speaker Verification Using Adapted Gaussian Mixture Models—Oct. 1, 2000.

Yaniv Zigel and Moshe Wasserblat—How to deal with multiple-targets in speaker identification systems?

A tutorial on text-independent speaker verification—Frederic Bimbot, Jean Bonastre, Corinn Fredouille, Guillaume Gravier, Ivan Chagnolleau, Sylvian Meigner, Teva Merlin, Javier Ortega Garcia, Dijana Deacretaz, Douglas Reynolds—Aug. 8, 2003.

Yeshwant K. Muthusamy et al—Reviewing Automatic Language Identification IEEE Signal Processing Magazine 33-41.

Marc A. Zissman—Comparison of Four Approaches to Automatic Language Identification of Telephone Speech IEEE Transactions on Speech and Audio Processing, vol. 4, 31-44.

Towards an Automatic Classification of Emotions In Speech—N. Amir. S. Ron.

* cited by examiner

METHOD AND APPARATUS FOR INTERNAL AND EXTERNAL MONITORING OF A TRANSPORTATION VEHICLE

RELATED APPLICATIONS

The present application claims priority from U.S. provisional patent application Ser. No. 60/362,073 titled CLOSE CIRCUIT TELEVISION RECORDING FOR REAL-TIME MONITORING IN A TRANSPORTATION VEHICLE AND FROM EXTERNAL FACILITIES, filed Mar. 7, 2002.

The present invention relates to U.S. provisional patent application Ser. No. 60/354,209 titled ALARM SYSTEM BASED ON VIDEO ANALYSIS, filed 6 Feb. 2002. The present invention is related to PCT application serial number PCT/IL02/01042 titled SYSTEM AND METHOD FOR VIDEO CONTENT-ANALYSIS-BASED DETECTION, SURVEILLANCE, AND ALARM MANAGEMENT, filed 24 Dec. 2002 and to PCT patent application serial number PCT/IL03/00097 for METHOD AND APPARATUS FOR VIDEO FRAME SEQUENCE-BASED OBJECT TRACKING, filed 6 Feb. 2003 both are incorporated herein by reference.

BACKGROUND OF THE INVENTION

1. Field of the invention

The present invention relates in general to remote surveillance and data communications. More particularly, the present invention relates to multi-channel recording and transmission of video, audio, and other data in order to provide for real-time monitoring both in transportation vehicles and from external facilities.

2. Discussion of the Related Art

Public transportation systems utilize transportation vehicles, such as aircraft, ships, trains, buses, and the like. The systems routinely carry a large number of passengers on pre-determined routes. The security of these systems is paramount if public safety is to be maintained in the event of an attack or other unexpected incident. Public transportation systems comprise mobile units, such as transportation vehicles that contain passengers and transportation personnel, such as pilots, flight attendants, drivers, inspectors, and the like, and one or more fixed-location command facilities. Typically, a radio communication network provides voice and data communication between the mobile units and the command and control centers. The mobile units may transmit status data, such as geographic location, heading, speed, engine and fuel data, and the like, over the radio communications network on a fixed or on-demand basis.

In land-based public transportation systems the availability of fixed routes enable the positioning of fixed image acquiring devices and other sensor devices along the routes in order to provide useful data to the command and control facilities. The data regards the location and the status of the mobile units and can be viewed in real-time or can be recorded for later replay and analysis.

Other types of public service vehicles, such as police cars, fire engines, ambulances, search and rescue helicopters, and the like, are also part of a public safety and security system. These vehicles provide rapid assistance in the event of an attack or other unexpected incident. These vehicles may also be the subject of an attack or incident. These mobile units also employ a radio communication network that communicates voice and other data to and from the command and control center. The mobile units also transmit status data, such as geographic location, heading, speed, engine and fuel data, and the like, over the radio network on a fixed or on-demand basis. It is essential that these mobile units receive accurate, comprehensive and timely information, using video, voice and other data transmissions from the command and control facilities concerning the incident to be handled in order to provide optimal assistance.

Many road networks are equipped with image acquiring devices, such as CCTV camera systems and other sensors that may send data back to the command and control facilities. The data may provide additional information about the location and the status of mobile units. The data may be viewed in real-time or may be recorded for later replay and analysis.

In non-land-based public transportation systems sophisticated on-board sensor devices are typically installed in the mobile transportation units, such as in aircraft and in ships. The function of the sensor devices is to provide human-readable status data to the operating crews of the transportation units and to provide machine-readable control data to on-board computing and control devices. The mobile units could further include multimedia data acquiring devices, such as CCTV camera systems, microphone arrays and other sensors in order to provide video, audio and other types of monitoring capabilities, respectively, to the operating crews of the mobile units. The airborne or maritime mobile units typically employ a radio communication network that communicates voice and other data to and from a ground-based or land-based command and control center, such as a flight control tower or a seaport command and control center. The mobile units may transmit status data, such as geographic location, heading, speed, engine and fuel data, and the like, over the associated radio network on a fixed or on-demand basis.

Currently systems monitoring transportation vehicles, such as ships, trains, buses, and the like, have several disadvantages. The primary drawback concerns the lack of means and capabilities for “handing over control” to external facilities, such as command and control centers, in order to provide event monitoring, event recording and event analysis for the transportation device, externally.

The tragic events that took place on 11 Sep. 2001 had demonstrated this drawback alongside with other disadvantages. Several critically weak links in flight security were exposed including the following facts: a) flight crew in the flight deck of an aircraft is unaware of events occurring in passenger cabins, unless notified by the cabin crew; b) alarm triggered from an aircraft cannot reach a ground-based command and control center when the radio communications with the flight crew is interrupted; c) command and control center personnel are perplexed when anomalies, such as a communication interruption with the flight crew, or a sudden unexplained changes in the flight path occurs during the flight; and d) command and control center personnel lack the capability to monitor in-flight events as they occur in real-time. The same drawbacks exist with other vehicles of transport, such as ships, trains, buses and the like.

For example, presently, when an emergency situation develops on board an aircraft, the only means of communication between the aircraft and the Air Traffic Control center (ATC) is via the associated radio communication network. The communication link provided by the network is substantially limited to ATC facilities in the vicinity of the aircraft. The radio link must be maintained by the aircrew simultaneously with the handling of other urgent tasks related to the emergency. The prior art does not provide means and capabilities for handing over control to provide external event monitoring, event recording, and event analysis to a remote command and control center or other relevant parties. Except for audio transmissions no other real time data is available for analysis either on board of the aircraft or on the ground. The situation is further complicated when concurrent incidents occur on the aircraft, while real-time data is absent in the flight deck or at the command and control center for immediate analysis and for the performance of suitable actions. In addition, in cases where the aircraft crashes substantial resources and time is invested in the location of the flight recorder device in order to analyze the data saved therein. In cases where the location of the flight recorder device is impractical, or the flight recorder device is substantially damaged even this minimal data is lost.

Therefore, there is an urgent need for real-time monitoring of video, audio and other data transmissions from multiple mobile units and multiple fixed sources at one or more command and control centers. There is a further urgent need for recording the transmissions and being able to redistribute as well as rapidly search and replay one or more recording segments at one or more command and control centers in near real-time in order to provide assistance in the handling of the incident. There is a further need to replay one or more recording segments to other mobile units via a radio network to assist in the management of the incident. There is a further need to search and to replay particular combinations of the recordings in combination with other collected data in order to assist in the post-event investigation, analysis, re-construction and debriefing.

SUMMARY OF THE PRESENT INVENTION

One aspect of the present invention regards an apparatus for the monitoring and recording of data stream associated with a transportation vehicle, the apparatus comprising a capture device for receiving the data stream depicting activities within the transportation vehicle; a recording device for recording the captured data stream about the activities within the transportation vehicle; and a communication device for communicating the recorded data stream to a monitoring station. The apparatus further comprises an alarm activator device for activating the at least one capture device. The apparatus also comprises a database device for storing the recorded multi-media data stream and an analysis device for analyzing the data stream. The apparatus may also include a disabler device for disabling the control of the transportation vehicle or for controlling the transportation vehicle from a location external to the transportation vehicle. The apparatus may further comprise a control device for controlling the capture device or the recording device or the communication device. The apparatus can further comprise a monitoring device for monitoring events captured by the capture device. The apparatus further comprises a retrieval device for retrieving a part or whole of the data stream captured by the capture device associated with the transportation vehicle. The data stream is a synchronized multi channel multimedia data stream. The data stream can also be a synchronized multi channel multimedia data stream and radio signals. The capture device can be a video camera or x-ray camera or any other camera. The capture device can be a microphone or any other instrument for capturing audio or similar signals. The capture device can be a radio receiver. The capture device or the recording device or the communication device can be located within the transportation vehicle. Alternatively, the capture device is located within the vehicle while the recording device can be located external to the transportation vehicle. The analysis device can also be located within or external to the transportation vehicle. The communication device transmits a transmission to be later redistributed.

A second aspect of the present invention regards a method for the monitoring and recording of data stream associated with a transportation vehicle, the method comprising the steps of receiving the data stream depicting activities within the transportation vehicle by a capture device; recording the captured data stream about the activities within the transportation vehicle by a recording device; and communicating the recorded data stream to a monitoring station by a communication device. The method further comprises the step of activating the capture device by an alarm activator device. The method further comprises the step of storing the recorded multi-media data stream in a database. The method further comprises the step of analyzing the data stream and the step of disabling the control of the transportation vehicle. The method also comprises the step of controlling the transportation vehicle from a location external to the transportation vehicle or the step a control device for controlling the capture device or the recording device or the communication device. The method further comprises the step of monitoring events captured by the capture device. The method further comprises the step of retrieving a part or whole of the data stream captured by the capture device associated with the transportation vehicle.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
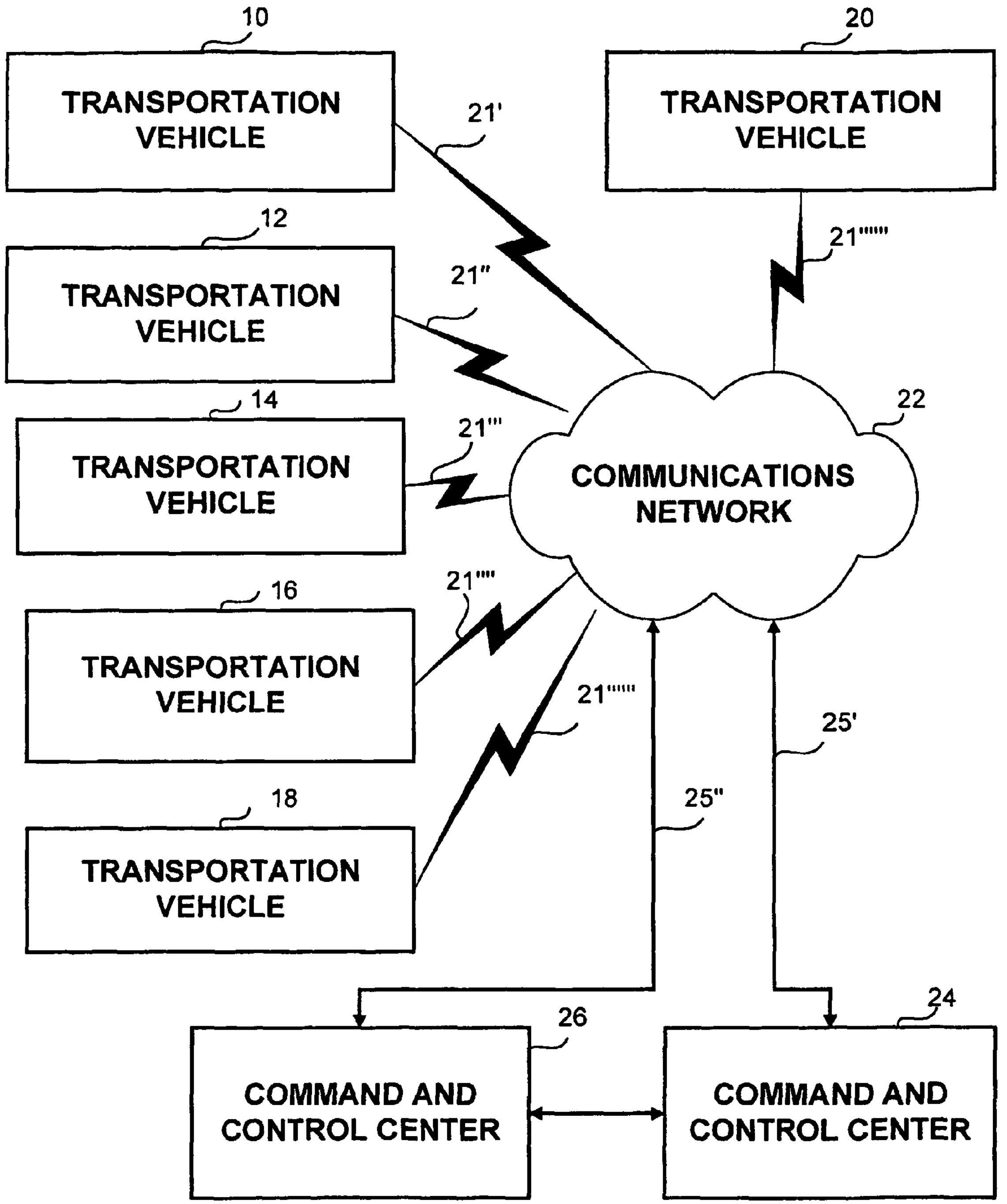
FIG. 1 is a block diagram that shows the constituent elements of a system in which the proposed method operates, in accordance with a preferred embodiment of the present invention.

The present invention discloses an apparatus and method for the recording, transmission, redistribution, and real-time monitoring of multi-channel multi-media data stream internally in a transportation vehicle and externally from external facilities. The recording, transmission and monitoring can be accomplished internally within the transportation vehicle, or at a location remote to the transportation vehicle, such as at a command and control center or a crisis-management facility. Each transmission may be redistributed to other centers or vehicles or persons. Recording and monitoring could be performed simultaneously in the transportation vehicle and at the remote facility. In the preferred exemplary embodiment of the present invention the monitoring and recording is performed in association with an in-flight system of an aircraft and the external facility is a flight control tower at an airport or any other ATC facility, such as a command and control center, a crisis management center, and the like. A person skilled in the art will appreciate that for each transportation vehicle applicable locations for capturing, recording and analyzing devices exist and that such are easily locatable. The present example of an in-flight system is in no way limiting and could be applied to other transportation vehicles, such as trains, buses, ships, emergency service vehicles, and the like. Similarly, the location of the recording or analyzing devices can be located in the transportation vehicle, at a remote location or at both locations at the same time. Control and alarm triggering devices can also be located at the transportation vehicle or at a location external to the transportation vehicles or at both locations.

The present invention operates in conjunction with a computerized based system such as the Nice Vision® Virtual product manufactured by Nice Systems Ltd. of Ra'anana, Israel, or the like. The computerized system comprises a software based, platform independent, multi-media recording system. The computerized system is based on standard Internet Protocol (IP) architecture. The system performs various functions of a multimedia data acquisition process and could include but is not limited to up to about twenty image acquisition devices, such digital video cameras, audio data acquisition devices, such as microphones, data acquisition devices, such as diverse sensor devices, and the like. The system utilizes compression techniques and provides for synchronized storage of the multimedia data in a computing platform, such as a personal computer (PC). The computerized system can retrieve selected video, audio, and other type of data for presentation and analysis. The system can further deliver, upon request, the recorded multimedia data over communications networks to a remote storage and observation sites. Control of the system is achieved by an operator located at the same site where the system is located or at a remote site through the use of standard aircraft or other vehicle communication downlink, such as via a satellite network or an IP WAN network or radio network or the like.

Referring to FIG. 1 transportation vehicles 10, 12, 14, 16, 18, 20 are linked to command and control centers 26, 24 via a communications network 22. The transportation vehicles 10, 12, 14, 16, 18, 20 are mobile vehicles carrying passengers or cargo and operating crew, such as commercial aircraft, ships, buses, trains, and the like. The vehicles 10, 12, 14, 16, 18, 20 could be further emergency service vehicles, such as police cars, ambulances, fire engines, search and rescue helicopters, and the like. The vehicles 10, 12, 14, 16, 18, 20 are provided with on-board multi-channel multi-media data capture devices, monitoring devices, recording devices, control devices and analyzing devices. The multi-media data includes but not limited to video, audio, and other data. The vehicles 10, 12, 14, 16, 18, 20 are further provided with suitable communication facilities that enable two-way transmission of the captured multi-media data streams to the command centers 24, and 26 via a wireless communication link 21', 21", 21'", 21"", 21'"", 21""", respectively. The command and control centers 24, 26 are linked to the communication network 22 typically via wired communication lines 25', 25", such as dedicated and secure telephone lines, and the like. The command and control centers 24, 26 are provided with the capability of communicating with each other in order to provide for the two-way transmission of the multi-media data streams for purposes of further monitoring, enhanced analysis and advanced event handling. In the exemplary preferred embodiment of the invention the vehicles 10, 12, 14, 16, 18, 20 are commercial aircraft carrying passengers and operating crew, the communications network 22 is an IP WAN network, such as the Internet, and the command and control center 24 is located a flight control tower at an airport, and the command and control center 26 is a crisis management center that could be located at the same airport or at a remote location to the airport. The command and control centers 24, 26 include multimedia data stream transmission, monitoring recording, control and analysis facilities. Multi-media data streams captured in the transportation devices 10, 12, 14, 16, 18, 20 are controllably recorded, monitored and analyzed on-board of the vehicles internally. The multi-media data streams recorded in the vehicles 12, 14, 16, 18, 20 could simultaneously transmit via the wireless communication links 21', 21", 21'", 21"", 21'"", 21""", via the communications network 22, via the wired communication links 25', 25" to the command and control centers 24, 26. The transmission of the multi-media data streams provides the option to the command and control centers 24, 26 to record the data transmitted from the vehicles 10, 12, 14, 16, 18, to monitor the data, to analyze the data in real-time, in near real-time or offline, and to selectively forward the data to additional ground-based facilities. The manner and the duration for transmission of the multi-media data from the vehicles 10, 12, 14, 16, 18, 20 could be pre-defined. For example, the transmission of the data from the vehicles 10, 12, 14, 16, 18, 20 could be controlled by the vehicles' operating crew. The transmission could be periodic, such as a sample of the data stream to be delivered at pre-defined intervals. The transmission could be initiated automatically at a specific location in space, such at a distance of about five miles from the airport. The transmission could be initiated by the command and control center 24, 26 following the reception of a specific alarm indicator, activated either manually or automatically, from the vehicles 10, 12, 14, 16, 18, 20 or due to an operator's decision. The transmission could be performed in a peer-to-peer mode between various vehicles either where the receiving vehicle is used as a transmission relay station to the command and control center 24, 26 or where the receiving vehicle is being used as an airborne command and control center or where the receiving vehicle is an emergency vehicle in which emergency services personnel monitor the transmission.

Note should be taken that the vehicles 10, 12, 14, 16, 18, 20 include but are not limited to cargo aircraft, military aircraft, spacecraft, unmanned aerial vehicles (UAVs), emergency service helicopters, and the like. In other preferred embodiments of the invention the vehicles 10, 12, 14, 16, 18, 20 include but are not limited to maritime vehicles, such as ships, ground vehicles, such as trains, buses, emergency vehicles such as police, fire department, search and rescue vehicles and the like.

Although on the drawing under discussion only a limited number of transportation vehicles and a limited number of command and control centers are shown, it would be easily perceived by one with ordinary skills in the art that in a realistic environment a plurality of transportation vehicles could transmit a plurality of captured data streams to a plurality of command and control centers. Similarly, in a realistic situation a single command and control center could receive data transmitted from a plurality of transportation vehicles.

Figure 2:
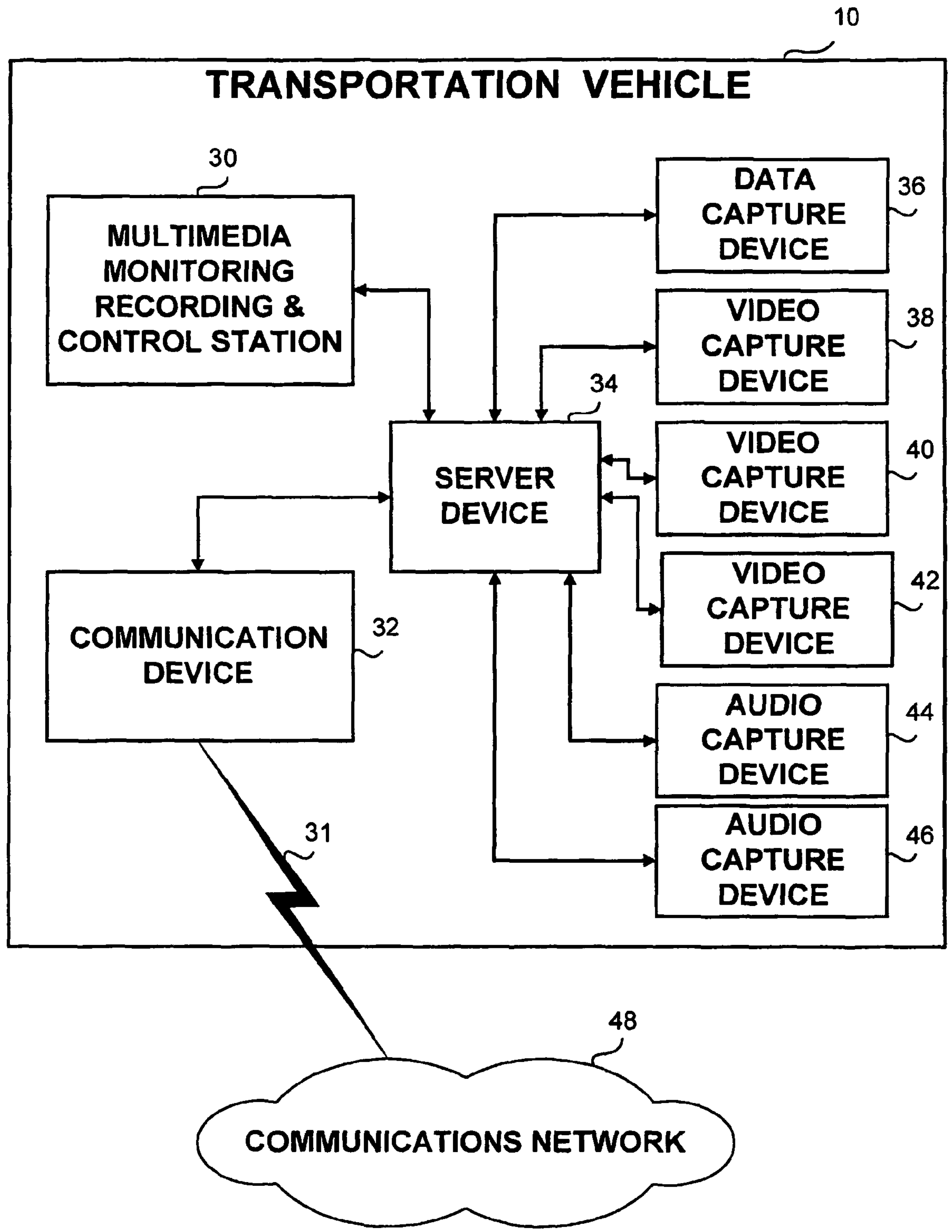
FIG. 2 is a schematic block diagram showing the operative components of the proposed apparatus in the transportation vehicle, in accordance with the preferred embodiment of the present invention.

Referring now to FIG. 2 transportation vehicle 10 includes a multimedia monitoring, recording and control station 30, a data capture device 36, video capture devices 38, 40, 42, audio capture devices 44, 46, a server device 34, and a communication device 32. Transportation vehicle 10 could be a commercial aircraft carrying passengers and operating crew. The vehicle 10 includes a flight deck, a cargo section, and one or more passenger cabins. The transportation vehicle may be a ship or a train or any other people or cargo transport vehicles. The capturing device 36, 38, 40, 42, 44, 46 are distributed across the internal space of the aircraft or vehicle in a pre-determined manner so as to enable capturing of events on board the vehicle. Thus, for example, in an aircraft the passenger cabins are equipped with image acquiring devices, such as several video cameras 38, 40, 42, that record sequences of video images showing the events taking place in the passenger cabin. The passenger cabins could be further equipped with audio capture devices 44, 46, such as microphones that record audio data concerning the various aural events taking place in the passenger department. Additional video capture devices, and audio capture devices could be installed in the flight deck or vehicle control cabin and in the cargo space of the aircraft or vehicle. The video capturing devices may be hidden or located in such a manner so as not to be detected or interfered with. A data capture device 36 could be linked to the control systems and the sensors of the aircraft to collect navigational data, altitude or spatial-related data, speed data, engine and fuel information, environmental data (both internal and external), auxiliary systems and the like. Additional multi-media data capture devices could be installed in the interior and the exterior of the aircraft at pre-determined locations designed such as to provide for optimal data capturing characteristics. Such can include video capturing devices showing the exterior or surrounding of the vehicle. The captured multi-media data, such as video, audio and other data is transmitted through a vehicle Local Area network (LAN) to the server device 34. Such LAN may be wireless or hardwired. The server device is operative in the recording of the captured data, in the selective retrieval of the recorded data, and in the optional transmission of the recorded data to a remote location via the communication device 32, the wireless link 31, and the communications network 48. The multimedia monitoring recording and control station 30 is typically located in a secure location such as the flight deck of the aircraft, a cargo area, a crew cabin area, or other locked and secured location on board the vehicle. The station 30 is linked to the server device 34 via the on-board Local Area Network. The vehicle's crew, such as the pilots or drivers, engineers, attendants, and the like, operates the station 30. The station 30 may enable physical control of the data capturing devices 36, 38, 40, 42, 44, 46, and the selective display of the captured video data, playing of the audio data, and display of the other data. The station 30 further provides the option of re-playing segments of the captured data in a selective manner, to initiate transmission of the recorded data to a remote command and control station, to raise an alarm and to transmit an alarm indicator, to analyze the captured data, to retransmit other information or data received from other vehicles, and the like. The station 30 further includes the option of permanently or temporarily disabling the control capabilities of the station 30 itself in order to finalize the handing of the remote control to the command and control center in extreme emergency situations. For example, if an aircraft or a train or a ship are hijacked a remote location may assume control of the vehicle in order to avoid damaging the vehicle or endangering the passengers, crew or cargo. In addition, a remote location may control the various elements of the present invention within the vehicle. For example, the remote location may tilt or zoom the video capture devices. The remote control may also use speakers to speak with passengers or persons inside the vehicle.

Figure 3:
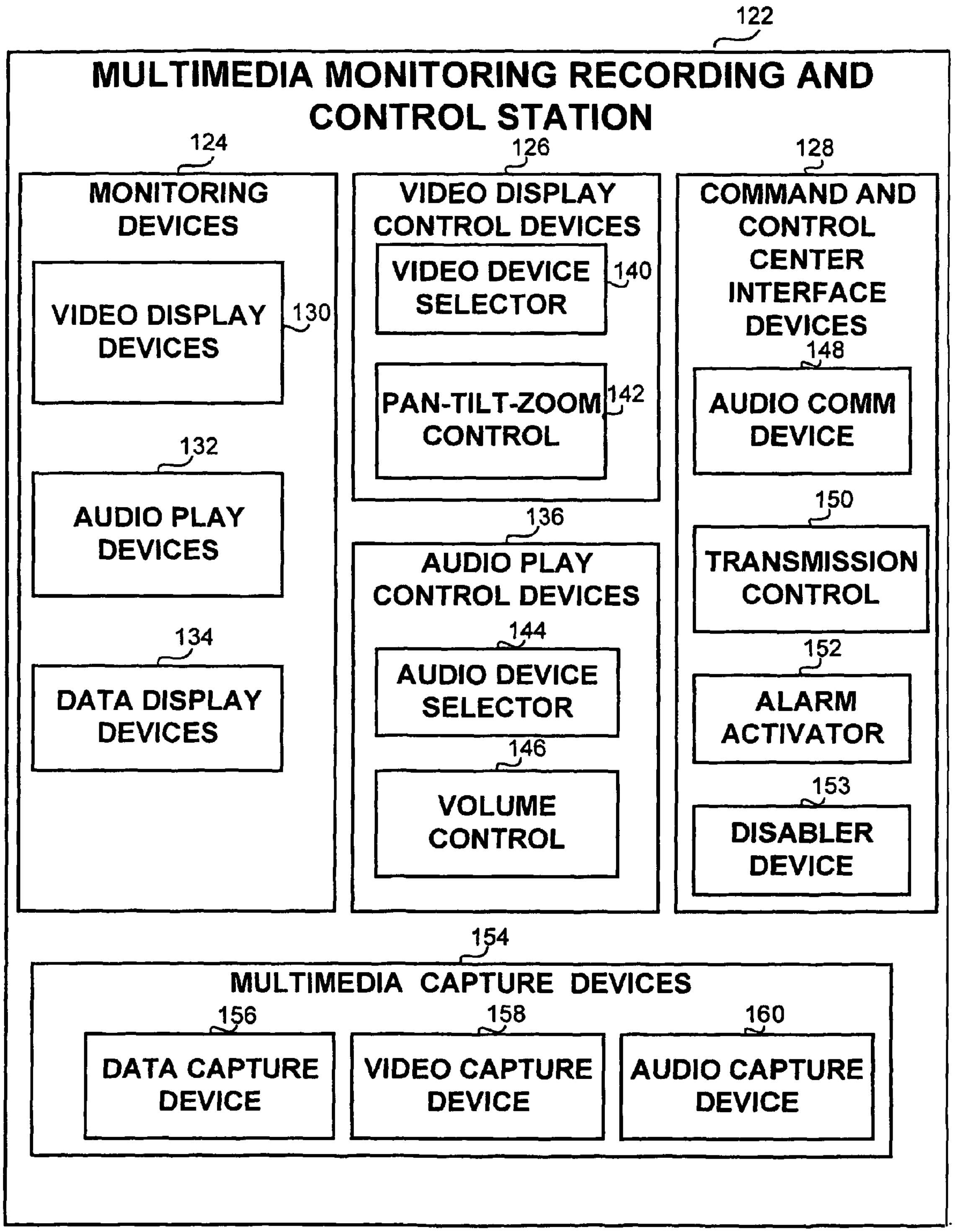
FIG. 3 is a block diagram illustrating the components of the multimedia monitoring recording and control station, in accordance with the preferred embodiment of the present invention.

Referring now to FIG. 3 the multimedia monitoring recording and control station 122 includes monitoring devices 124, video display control devices 126, command and control center interface devices 128, and multimedia capture devices 154. The monitoring devices 124 include but not limited to video display devices 130, audio play devices 132, and data display devices 134. The video display devices 130 are typically video display screens, the audio play devices are typically loudspeakers, or earphones, and the data display devices are display screens and/or various instrument panels. The monitoring devices 124 enable the operating crew to display events occurring at various locations in the vehicle in real-time and provide for the re-play of recorded past events. The video display control devices 126 provide the operating crew with the option of physically controlling the video capture devices distributed in the interior and the exterior of the airplane. The devices 126 include but are not limited to a video device selector 140, and a pan-tilt-zoom (PTZ) control 142. Video device selector 140 in association with PTZ control 142 provides the option of modifying selectively the field-of-view of a specific camera in order to follow an event taking place, a suspicious person, or the like. The audio control devices 136 allow for the control of audio capture devices, such as microphones distributed in the interior of the vehicle. The devices 136 include but are not limited to audio device selector 144, and a volume control 146. Audio device selector 144 in association with volume control 146 provides to option of switching off an audio capture device, switching on an audio capture device, and for modifying the volume settings of an audio capture device. Command and control center interface devices 128 enable the operating crew to communicate with the command and control center, to control the transmission of the recorded multi-media streams, to activate an alarm transmission, and to optionally disable the operation of the station 122 in order to prevent unauthorized tampering in extreme situations. The devices 128 include but are not limited to an audio communication device 148, a transmission control device 150, an alarm indicator device 152, and a disabler device 153. The station 122 further includes multimedia capture devices 154. The function of the devices 154 is to monitor specifically the manipulations performed on the station 122. These capture devices are typically hidden, or specifically enforced to prevent damage possibly inflicted in extreme situations. The devices 154 include but are not limited to a data capture device 156, a video capture device 158, and an audio capture device. The data capture device 156 collects data concerning the operations performed on the station 122. The transmission control device 150 is responsible for the transmission of the station-captured data in order to enable the command and control center to take optimal decisions concerning the validity of the data received. The device 150 handles communications with the command and control center as well as with other monitoring, recording and control stations located on the same vehicle or on other vehicles. The device 150 may be assigned an address such as an Internet protocol address and may handle control instructions provided from the command and control center or if so authorized from other vehicle. While the primary usage of the present system is for monitoring, capturing and recording of events aboard a vehicle, in extreme situations the device 122 may receive command instructions from a remote command and control center or vehicle and disable the internal controls of the vehicle. In one non-limiting example, law enforcement officers traveling in a search and rescue vehicle traveling along side the vehicle having an emergency situation aboard may not only view in real time the input provided by the video capture devices, listen to the audio capture devices, but also communicate with persons on board the vehicle or even take control of the vehicle in order to bring it to a stop or land it or direct it to a specific location. The disabler device may be used by persons located outside the transportation vehicle to both disable the control of the vehicle and for controlling the vehicle. The disabler device 153 is connected to all the vehicle controls, such as automatic pilot interface and direction controls as well as all other systems of the vehicle. Such device may be used in extreme situations and would effectively allow the guide or fly by wire of the vehicle. In addition, the controller may be able to operate various systems on the vehicle such as braking systems, gears, engine system, navigational systems, environmental controls and the like in order to effectively contain an emergency situation. In one non-limiting example, the pilots of an aircraft are disabled or incapacitated and control over the aircraft is assumed by a person external to the aircraft. The capture device located inside the flight deck will convey the sight viewed by the pilots. The controller will receive both video and audio input from the cockpit. The controller may effectively transmit commands to the flight deck thus assume the control of the aircraft.

Figure 4:
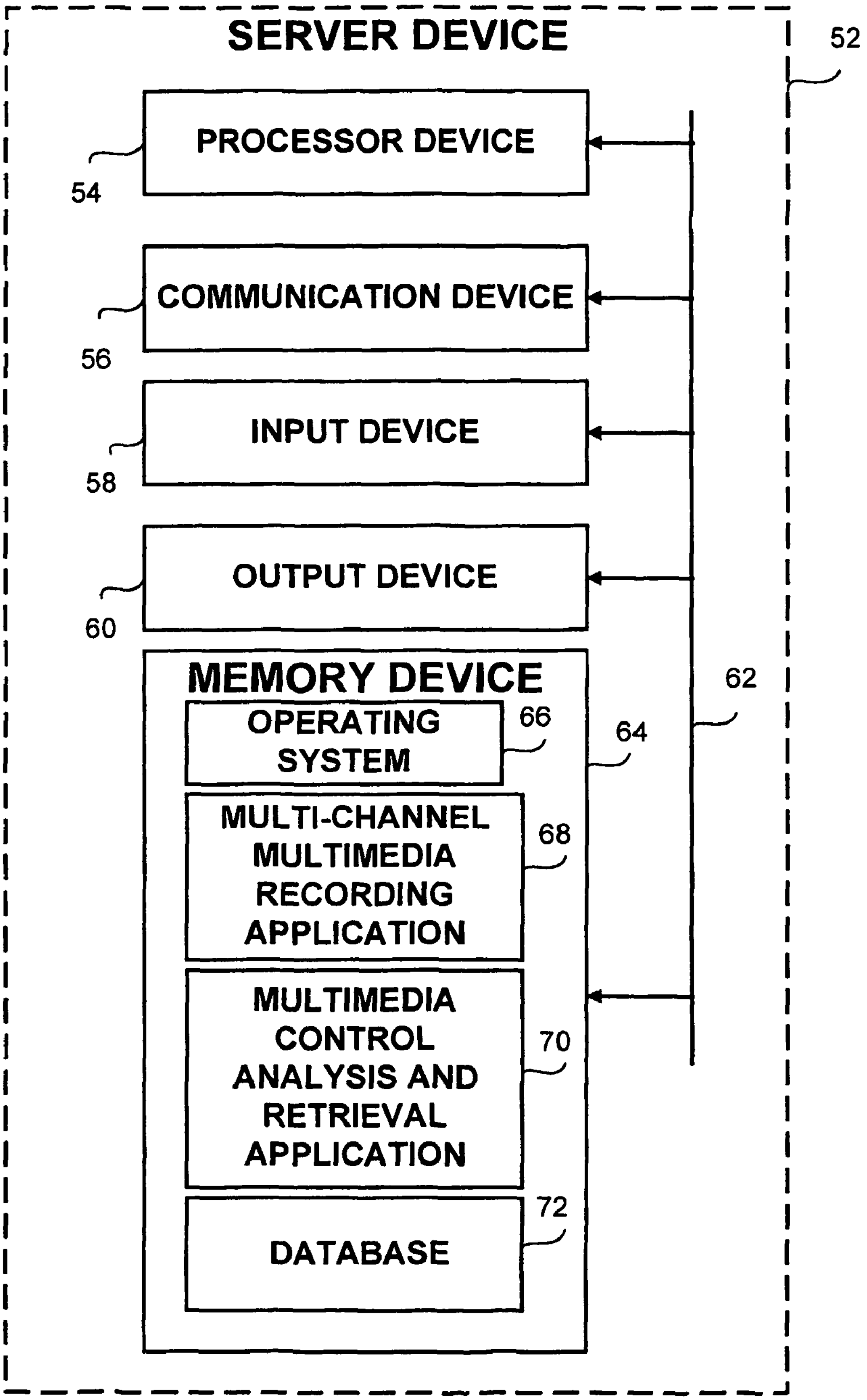
FIG. 4 is a block diagram illustrating the operative components of the server device, in accordance with the preferred embodiment of the present invention.

Referring now to FIG. 4 the server device 52 is a computing and communicating platform. Server 52 can be for example the E-SERVER ARINC 7634 MCU by Miltope Corporation of Hope Hull, Ala., USA or the like. Device 52 includes a processor device 54, a communication device 56, an input device 58, an output device 60, a storage device 64, and a data bus device 62. Communication device 56 is network interface card such as a LAN card. The device 56 is already typically wired in current passenger airplanes to enable air-to-ground voice communications for passengers. Like devices are located in ships and trains. The network interface card provides adequate video, audio and other data communication. Storage device 64 is preferably a hard disk or a DAT tape or any other storage device. Storage device 56 includes but is not limited to an operating system 66, a multi-channel multimedia recording application 68, a multimedia control analysis and retrieval application 70, and a database 72. Application 70 could be the Nice Vision® Virtual product or the like. One or more multi-media data capture devices, such as digital video cameras qualified for use in commercial aircraft or other vehicle of transport, microphones and other sensors, are connected to server 52 via an on-board local area network (LAN). The video, audio and other data streams captured by the multi-media data capture devices are recorded simultaneously into the database 72. Server 52 is connected to the aircraft air-ground communications system, which is also used for operational communication by the aircrew as-well-as for connecting the passenger telephones to the communication network.

Figure 5:
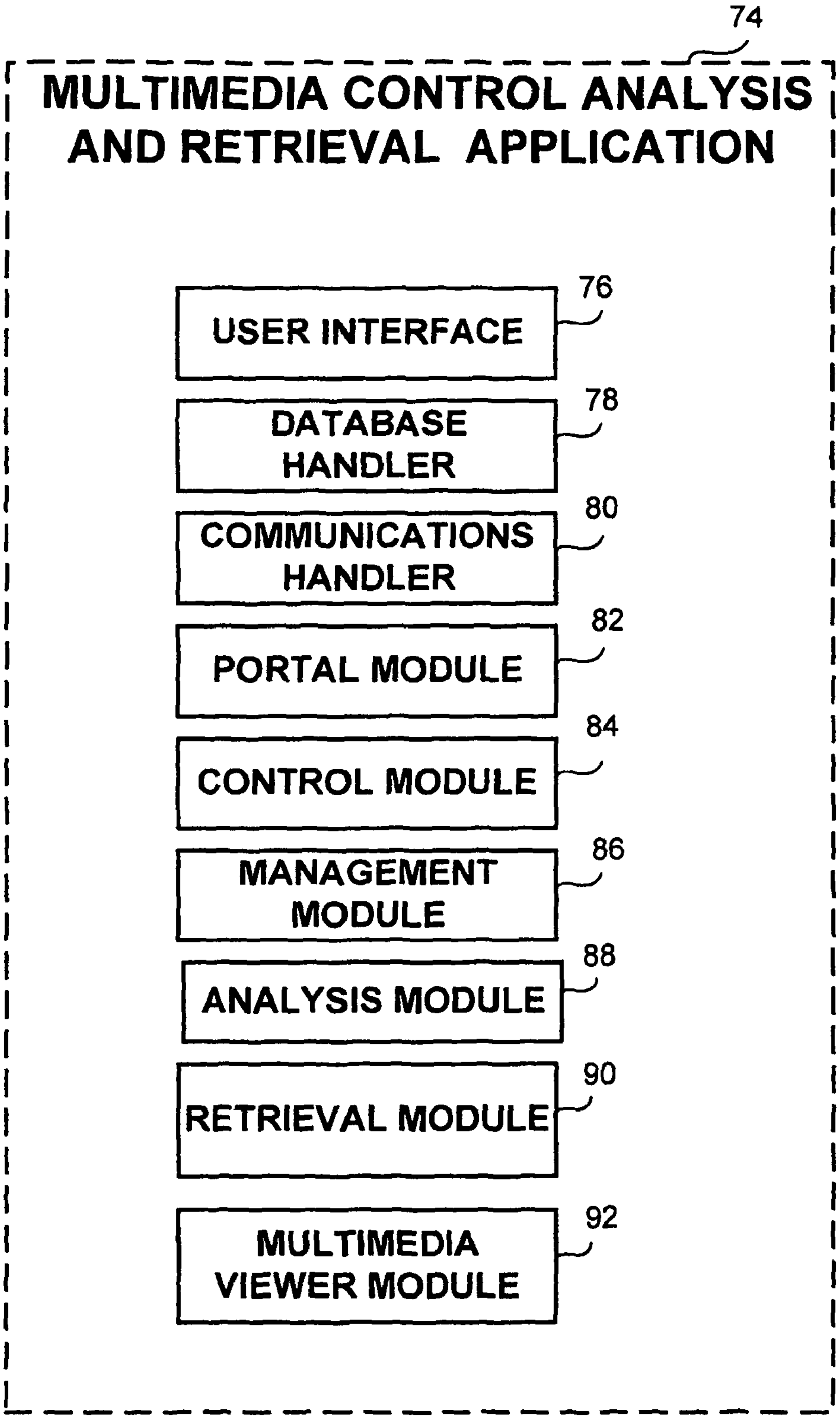
FIG. 5 is a schematic block diagram illustrating the operative components of the multimedia control analysis and retrieval application, in accordance with the preferred embodiment of the present invention.

Referring now to FIG. 5 the multi-media control analysis and retrieval application 74 includes a user interface 76, a database handler 78, a communications handler 80, a portal module 82, a control module 84, a management module 86, an analysis module 88, a retrieval module 90, and a multimedia viewer 92. User interface 76 provides the option of communicating with the operator of the system. The control analysis and retrieval application is used for the analysis and retrieval of video, audio and data captured aboard the vehicle. The communications handler 80 is responsible for the communications procedures. The handler 80 is responsible for all communications with the transportation vehicle. The control module 84 controls the execution of the application in accordance with the commands introduced by the operator of the system. The management module 86 is functional in the configuration of the application, in the setting of the operative parameters, in the maintenance of the system, and the like. The analysis module 88 handles the analysis process and the retrieval module 90 is functional is extracting requested data segments from the database for display or re-play via the use of the database handler 78. The multimedia viewer module 92 receives data from the retrieval module 90, formats the data for viewing and forwards the formatted data to the suitable display devices. An operator may use the user interface 76 to access the control, analysis and retrieval application 74 via the use of instructions and input devices such as a keyboard a pointing device or selection device such as a mouse or a touch screen and the like. The application 74 may be located and installed in the monitored vehicle in association with the monitoring, recording and control station 122 or in a command and control center or in other vehicles such as in a search and rescue or law enforcement vehicles.

Figure 6:
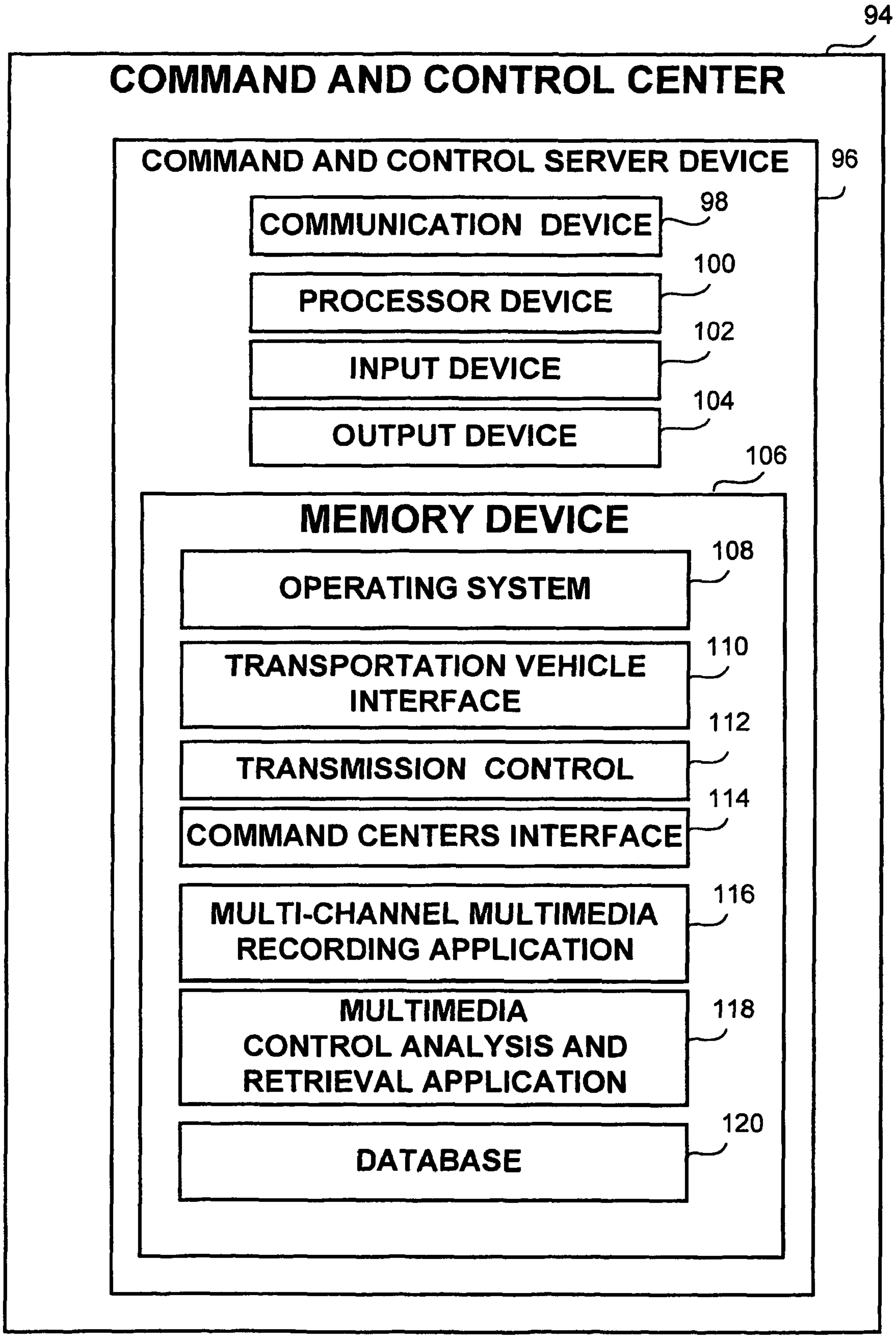
FIG. 6 is a schematic block diagram illustrating the operative components of the command and control center, in accordance with the preferred embodiment of the present invention.

Referring to FIG. 6 the command and control center 94 includes a command and control server device 96. The command and control center is preferably located within a control station relating to the vehicle such as a train station or a seaport or an airport or a center. In an alternative embodiment the command and control center may be located aboard a vehicle such as a law enforcement, search and rescue or like vehicle. The device 96 is a computing and communications platform. The device 96 includes a communication device 98, a processor device 100, an input device 102, an output device 104, and a memory device 106. The memory device 108 is preferably a hard disk or a DAT tape or another memory or storage device. The device 108 stores a set of operative software programs and associated data files. The device 108 includes an operating system 108, a transportation vehicle interface 110, a transmission control 112, a command centers interface 114, a multi-channel multimedia recording application 116, a multimedia control analysis and retrieval application 118, and a multimedia database 120. The communication device 98, such as a modem, a network interface card, and the like, is operative in the establishment of a communication link. The processor device 100 executes the program instructions. The input device 102 is preferably a keyboard, a pointing device, a touch screen device, a microphone and the like. The device 102 provides the option for the operator of the system to communicate with the application, such as submitting queries, activating specific program modules, selecting operating functions, and the like. The output device 104 is preferably a display screen via which a formatted display of the data is accomplished. The transportation vehicle interface 110 is responsible for accessing the data of a specific transportation vehicle. The transmission control 112 provides the option of initiating data transmission from and to a transportation vehicle, while the command centers interface 114 establishes a link to a remote command and control, center and initiates data transmission from and to the remote command center. The multi-channel multimedia recording application 116 receives and records data transmitted from a transportation vehicle or from a remote command and control center and records the data suitably indexed and formatted into the database 120. The multimedia control analysis and retrieval application 118 enables processing, analysis, and retrieval of recorded data.

In the preferred embodiment of the invention, video cameras, audio capture devices, and other data sensors are installed in locations considered such as critical security-specific events may take place. Thus, the video cameras and the microphones may be directed towards important areas of the aircraft to capture important events likely to occur in these areas. One example is the flight deck where a video camera pointed directly at the flight panel. Another could be an engine room or a cargo hold or lavatories. The camera and additional data capture devices, such as microphones and other sensors are placed such as to be able to record important events occurring in the flight deck. Another example can include video cameras and microphones directed at the galley, doors, and other key areas. The video cameras, microphones and other data sensors may be installed such as to be visible or to be concealed depending on their location and use. In normal operation the system, such as Nice Vision® Virtual system records time synchronized video and audio data captured from the entire set of cameras, microphones and other sensors mounted in the vehicle. The captured video data is stored as full frame rate compressed information in the server device's hard disk or storage device for the duration of the trip. The pilots, drivers, or other authorized crew members can view on the monitor devices real-time video data of any specific camera, or could have an automatic scan of all cameras. The PTZ control may be used by the operating crew to obtain maximum relevant data from each camera. The standard aircraft communication downlink is used for downloading recorded data from the memory device of the server to a ground recording station, which may be a complementary part of the Nice Vision® Virtual system or similar systems, via a satellite network and/or a WAN communication network, such as the Internet. In other vehicles a wireless communications network can be used or a rail electrical system or a satellite uplink can be used to provide the down stream connection. The same avenue may be used for the return stream and for establishing a multi channel two-way communication between the vehicle and other parties. The Nice Vision® Virtual system provides flexibility in bandwidth usage during transmission, and can adapt to the available bandwidth. Reference is made to PCT patent application serial number PCT/IL03/00097 for METHOD AND APPARATUS FOR VIDEO FRAME SEQUENCE-BASED OBJECT TRACKING, filed 6 Feb. 2003 providing additional detail on video frame adaptation. The ground recording station can be located, for example, in an airport tower or in other ATC facilities or other control station, ports, stations and the like. Other related command and control centers can receive the video, audio and other data concurrently via IP based network connections. The utilization of satellite downlink ground facilities the recording of the data could be either continuous throughout the entire duration of the trip or to be performed upon request from ground-based control center or the control deck in case of emergency. In addition, the recording can be performed at various predetermined intervals, such as every several minutes, or at predetermined locations, such as a 5 miles distance estimation of a certain radio range, or when crossing a particular cross section, intersection, cross roads and the like.

In emergency, when the crew is burdened with other more pressing tasks or when the crew is neutralized, the command and control center may take over the monitoring of the cameras including PTZ control, thereby providing continuously available and recorded real-time video data. As previously noted the command and control center may also assume control of the vehicle. The command and control centers may receive images from one or more cameras on one or more aircraft. Recording in the command and control centers can also be initiated automatically by an alarm indicator triggered either from the vehicle or from a control or center station in order to facilitate emergency incident recording. Alarm can be set manually or automatically by connecting an alarm detector device to the Nice Vision® Virtual system.

The alarm triggering device alarm can be located in the control deck of the vehicle or in any other predetermined location on the vehicle. The alarm triggering device could be provided to a crewmember, to a designated in-flight or on board security service personal, whether in uniform or in plain clothes, or to a crewmember disguised as a passenger. Thus, in the event of, for example, a hijacking emergency the hijacking team will not be able to first prevent the triggering of the alarm.

Another important feature of the invention is the capability to analyze the recorded video, audio, and other data after the incident. The Nice Vision® Virtual system features fast "search and find" using digital technologies and playback functions that includes fast playback, slow motion, frame by frame advance, instant skip to a specific point in time and digital zoom on any image. Queries can be submitted according to time, dates, events, channels, and data annotations. Thus, suitably authorized personnel could rapidly receive vital information concerning an ongoing emergency or an emergency, which has culminated in a crash or substantial damage to the vehicle. In addition, the system can be linked with a location-based system located either on the vehicle or at an information facility, which provides details of the location and speed of the vehicle at any given time. The link provides a location-based or speed-based alert or analysis. The establishment of the link may also assist to determine rapidly the location of the survivors or the location of the aircraft. The process of analysis may be accomplished automatically or manually. Automatic analysis may be performed in accordance with predetermined rules relating to events occurring within the transportation vehicle. Such rules may include for example, a rule stating that if a sound above a particular threshold is captured by the capturing device the system must begin recording and an analysis of the sound is performed. If for example the sound resembles a gunshot or a loud scream an alert is raised and an alarm is send to a predetermined person while the system continues to record the data provided by the capturing devices. Likewise in another example, if the vehicle does not follow a prearranged course the system of the present invention will initiate recording and if the deviation in spatial location exceeds a certain threshold (such as 5 nm from the predetermined route or 2,500 feet unapproved change in altitude) an alert is raised and an alarm is send to a predetermined person while the system continues to record the data provided by the capturing devices. In another example, the vehicle monitored is a train wherein a major engine malfunction occurs. The system will automatically begin recording the events on the train as well as the events relating to the train systems. Both train tracks controllers will be provided with online video and audio captured from the train cockpit in an attempt to overcome the malfunction. Emergency services personnel will also receive direct and online feed of data showing the number of people on the train the location of the train and other pertinent data captured by the system. The same data may be distributed to a wide range of responding units, each unit relaying or redistributing the same to a close by unit. If for example, the train crashes, replay of video captured during the crash may assist rescue personnel to assist survivors immediately. Each rescue unit having a control, analysis and retrieval application may independently retrieve, investigate, replay and analyze captured data to ascertain the location of survivors moments after the accident occurred. Each rescue or other emergency unit may be equipped with mobile devices such as the TETRA Mobile Data Service Dimetra IP from Motorola, Inc. The same system may be used for crime prevention and crime investigation. If a crime is committed aboard the train or other monitored vehicle, police officers may immediately re-play captured data to obtain information about the perpetrator of the crime and potential witnesses, examine the route taken by the involved individuals and begin an investigation likely to be resolved quickly. The system will transmit replays or data or information in real time to small hand held devices such as the TETRA MTP700 enabling constant monitoring or examining of the event unfolding. The system of the present invention may rely on additional sources from which data can be captured, such as road networks equipped with capturing devices and other road, track, or atmospheric and sea sensors. The system of the present invention may also simultaneously capture and record all communications between the vehicle or other units (such as police, fire department, search and rescue and others) in synchronization with data and information captured from the transport vehicle. At a later stage an investigative tool may be used to debrief each incident or event captured. This tool enables the review of the event or incident as it unfolds second by second providing all the data captured synchronized with radio transmissions or other communications made by each person or unit on the scene. In one example, operative cameras still working after such accident may continue operation even after the accident has occurred and continue to provide live feed to rescuers and other law enforcement agencies personnel. The continued capturing of events is not only instrumental in saving lives but may also provide an indicator to the responsiveness of the emergency services.

The multi-media data received from a transportation vehicle is recorded and analyzed at a command and control center, it may be forwarded to other command and control centers for re-play, in-depth analysis and optionally for further re-transmission. Thus, data can be further distributed upon request to other interested parties, such as for example, police headquarters, FBI offices, national, state and international authorities, carriers, insurance companies, damage assessors, and the like. In addition, the data can be further processed and analyzed in depth. For example, a sequence of video frames could be re-processed to highlight or suitably mark interesting inter-frame elements in order to assist in the re-construction of an improved real-time scenario and in order to provide a more intensive and accurate de-briefing.

In other preferred embodiments of the invention, re-processed data could be sent back to the transportation vehicle. For example, in a emergency service application a police car provided with data recording and data transmission capabilities could obtain a sequence of video images captured by an on-site fixed video camera where the sequence of video images could contain the images of a crime-related event that occurred prior to the arrival of the police vehicle. The police officers manning the transportation vehicle or arriving at the scene could instantly re-play the video recording in order to verify the sequence of events in near real-time. If required, the data could be transmitted by the police vehicle to a command center for further processing in order to extract from the sequence of images specific critical details, such as for example, the license plates of a hit-and-run car or other crime scene characteristics. The video sequence could be re-processed suitably at the command center and then transmitted back to the police car to provide the officers on the spot with enhanced information.

The person skilled in the art will appreciate that what has been shown is not limited to the description above. Many modifications and other embodiments of the invention will be appreciated by those skilled in the art to which this invention pertains. It will be apparent that the present invention is not limited to the specific embodiments disclosed and those modifications and other embodiments are intended to be included within the scope of the invention. Although specific terms are employed herein, they are used in a generic and descriptive sense only and not for purposes of limitation.

It will be appreciated by persons skilled in the art that the present invention is not limited to what has been particularly shown and described hereinabove. Rather the scope of the present invention is defined only by the claims, which follow.

What is claimed is:

1. An apparatus for the recording, playback and investigation of an event associated with a transportation vehicle, from at least two synchronized streams carrying audio and video and data information associated with the transportation vehicle, the transportation vehicle being in communication with a command and control center, the apparatus comprising:

at least two capture devices for capturing the at least two synchronized streams carrying audio and video and data information depicting activities associated with the event;

at least one recording device for recording the at least two synchronized streams depicting the activities associated with the transportation vehicle in synchronization;

at least one communication device for communicating at least one of the at least two recorded streams to a monitoring station;

an investigative tool for debriefing the event at a later stage;

a command and control center interface for establishing a link between the command and control center and a remote command and control center; and a multi-channel multimedia recording application that receives and records data information from the at least two capture devices capturing activities in or near the transportation vehicle, and information transmitted from the remote command and control center, wherein communication between the command and control center and the remote command and control center is captured at the command and control center, wherein the multi-channel multimedia recording application records the data indexed and formatted into a database and wherein at least one of the at least two streams is synchronized with a radio transmission or communication made by a person on the vehicle.

2. The apparatus of claim 1 further comprising at least one alarm activator device for activating at least one of the at least two capture devices.

3. The apparatus of claim 1 wherein the database stores the at least two streams.

4. The apparatus of claim 1 further comprising an at least one analysis device for automatically analyzing an at least one of the at least two synchronized streams.

5. The apparatus of claim 4 wherein the at least one analysis device is located within the transportation vehicle.

6. The apparatus of claim 4 wherein the at least one analysis device is located external to the transportation vehicle in a command and control center or a crisis-management facility.

7. The apparatus of claim 4 wherein the analysis device initiates recording if the transportation vehicle does not follow a prearranged course.

8. The apparatus of claim 1 further comprising a disabler device for disabling the control of the transportation vehicle.

9. The apparatus of claim 1 further comprising a disabler device for controlling the transportation vehicle from a location external to the transportation vehicle.

10. The apparatus of claim 1 further comprising a control device for controlling at least one of the at least two capture devices or the at least one recording device or the at least one communication device.

11. The apparatus of claim 1 further comprising a monitoring device for monitoring events captured by at least one of the at least two capture device.

12. The apparatus of claim 1 further comprising a retrieval device for retrieving a part or whole of at least one of the at least two synchronized streams captured by at least one of the at least two capture devices associated with the transportation vehicle.

13. The apparatus of claim 1 wherein at least one of the at least two capture devices is a video camera.

14. The apparatus of claim 1 wherein at least one of the at least two capture devices is a microphone.

15. The apparatus of claim 1 wherein the at least one recording device is located within the transportation vehicle.

16. The apparatus of claim 1 wherein the at least one communication device transmits a transmission to be later redistributed.

17. The apparatus of claim 1 wherein the command and control center, and or the remote command and control center, receive information from the transportation vehicle.

18. The apparatus of claim 1 wherein the radio transmission is audio communication related to the event and exchanged by an emergency service.

19. The apparatus according to claim 1, wherein at least one of the at least two capture devices captures audio communication transmitted by a radio receiver.

20. A method for the recording, playback, and investigation of an event associated with a transportation vehicle, from at least two synchronized streams carrying audio and video and data information associated with the transportation vehicle, the transportation vehicle being in communication with a command and control center, the method comprising the steps of:

- establishing a link between the command and control center and a remote command and control center;
- receiving the at least two streams carrying audio and video and data information, depicting activities associated with the event, from at least two capture devices;
- recording in synchronization the at least two streams depicting the activities in or near the transportation vehicle and data information transmitted from the remote command and control center, by at least one recording device and a multi-channel multimedia recording application;
- communicating at least one of the at least two recorded streams to a monitoring station by a communication device, and
- wherein communication between the command and control center and the remote command and control center is captured at the command and control center,
- and wherein the multi-channel multimedia recording application records the data indexed and formatted into a database and wherein at least one of the at least two streams is synchronized with a radio transmission or communication made by a person on the vehicle.

21. The method of claim 20 further comprising the step of activating at least one of the at least two capture devices by at least one alarm activator device.

22. The method of claim 20 further comprising the step of storing the at least two streams in an at least one database device.

23. The method of claim 20 further comprising the step of analyzing at least one of the at least two streams.

24. The method of claim 23 wherein the analyzing is performed within the transportation vehicle.

25. The method of claim 23 wherein the analyzing is performed external to the transportation vehicle in a command and control center or a crisis-management facility.

26. The method of claim 23 wherein the analysis step initiates recording if the transportation vehicle does not follow a prearranged course.

27. The method of claim 20 further comprising the step of disabling control of the transportation vehicle.

28. The method of claim 20 further comprising the step of controlling the transportation vehicle from a location external to the transportation vehicle.

29. The method of claim 20 further comprising the step of controlling at least one of the at least two capture device or the at least one recording device or the communication device.

30. The method of claim 20 further comprising the step of monitoring events captured by at least one of the at least two capture devices.

31. The method of claim 20 further comprising the step of retrieving a part or whole of at least one of the at least two streams captured by at least one of the at least two capture devices associated with the transportation vehicle.

32. The method of claim 20 wherein at least one of the at least two streams is synchronized with a radio signal.

33. The method of claim 20 wherein at least one of the at least two capture devices is a video camera.

34. The method of claim 20 wherein at least one of the at least two capture devices is a microphone.

35. The method of claim 20 wherein at least one of the at least two capture devices is a radio receiver capturing transmission or communication made by a person on the vehicle.

36. The method of claim 20 wherein the at least one recording device is located within the transportation vehicle.

37. The method of claim 20 wherein the communication device transmits a transmission to be later redistributed.

38. The method of claim 20 wherein the radio transmission is audio communication related to the event and exchanged by an emergency service.

* * * * *